United States Patent [19]

Rodriguez

[11] Patent Number: 5,096,142
[45] Date of Patent: Mar. 17, 1992

[54] FOLDING INTERNAL COVER

[75] Inventor: Manuel J. Rodriguez, Signal Hill, Calif.

[73] Assignee: McDonnell Douglas Corporation, Long Beach, Calif.

[21] Appl. No.: 507,191

[22] Filed: Apr. 10, 1990

[51] Int. Cl.⁵ .............................................. B64C 9/02
[52] U.S. Cl. .................................... 244/87; 244/130
[58] Field of Search ............... 244/87, 45 A, 48, 130, 244/46, 56, 7 C; 89/37.16, 37.17, 36.14; 277/166, 212 F

[56] References Cited

U.S. PATENT DOCUMENTS

| | | | |
|---|---|---|---|
| 2,338,950 | 1/1944 | Linke et al. | 89/36.14 |
| 2,573,434 | 10/1951 | Corahan | 89/36.14 |
| 2,981,504 | 4/1961 | Parker | 244/48 |
| 3,307,807 | 3/1967 | Stoppe | 244/48 |
| 3,756,529 | 9/1973 | Backlund et al. | 244/87 |
| 4,034,939 | 7/1977 | Ridley et al. | 244/48 |

Primary Examiner—Galen Barefoot
Attorney, Agent, or Firm—Gregory A. Cone; John P. Scholl; James M. Skorich

[57] ABSTRACT

An aerodynamic fairing seal for use on a variable incident airfoil which protrudes through a structural opening in an aircraft such that the fairing covers the opening as the airfoil is moved during flight. In the preferred embodiment on a T-tail configuration aircraft which utilizes a vertical stabilizer that supports a variable incident horizontal stabilizer at its uppermost section, a cover plate is attached to the upper surface of the horizontal stabilizer support structure such that it moves with the horizontal stabilizer. In addition, the cover plate is mounted internally to and adjacent to the structural opening in the vertical stabilizer through which the horizontal stabilizer protrudes. The cover plate is composed of two panels, an upper end and a lower panel, connected by a hinge and a torsion spring. A means is provided to hold the panels adjacent the structural opening when the horizontal stabilizer is in its lowermost position. When the horizontal stabilizer is raised, the cover plate rises within the vertical stabilizer and a means is provided to allow the upper panel to fold thereby greatly reducing the area needed on the vertical stabilizer to cover the structural opening. The folding action of the top panel allows a designer to reduce the height of a vertical stabilizer in a T-tail configuration as compared to a design which uses a conventional cover plate. The mounting of this aerodynamic seal within the vertical stabilizer also reduces the overall aerodynamic drag on the aircraft.

16 Claims, 5 Drawing Sheets

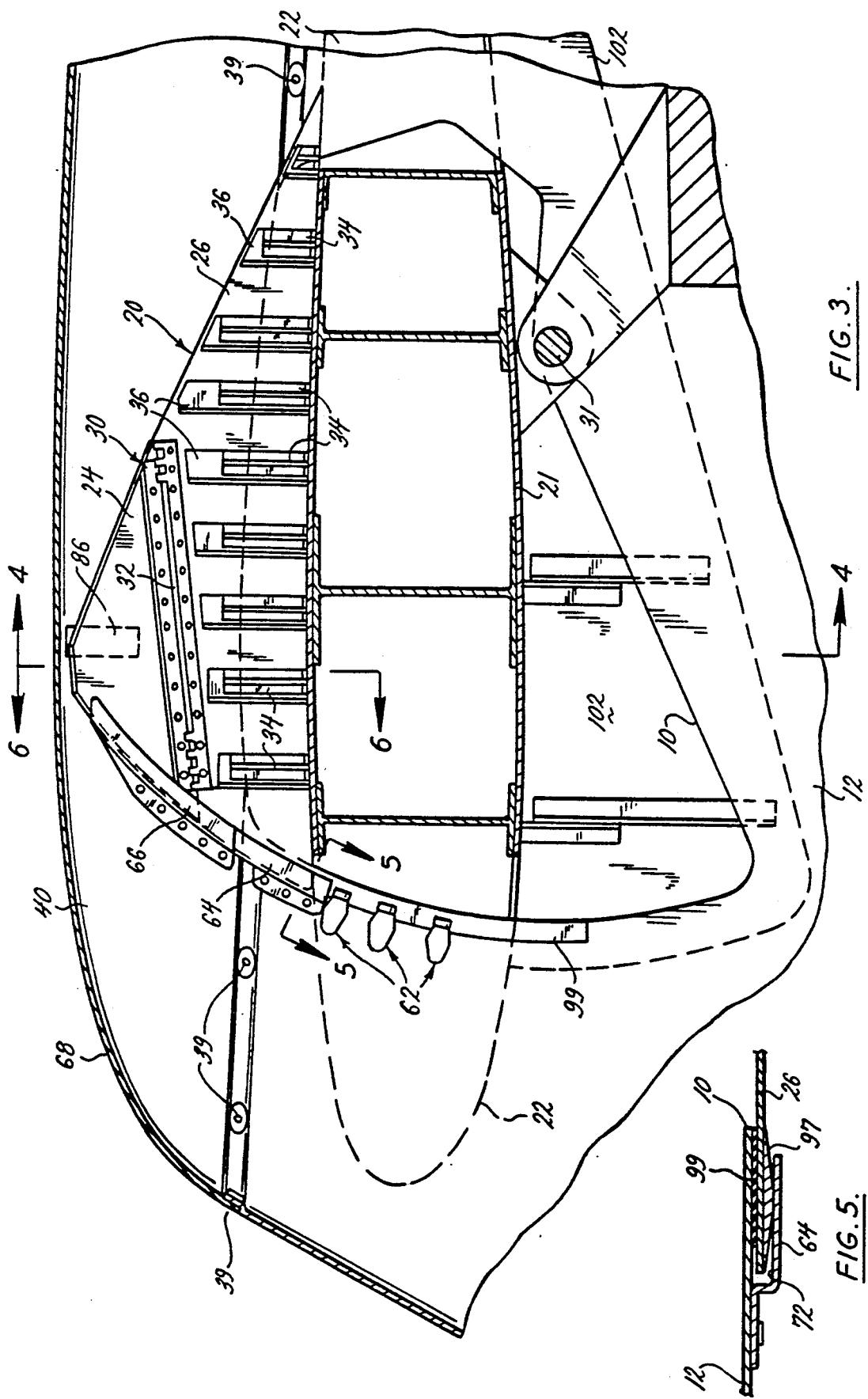

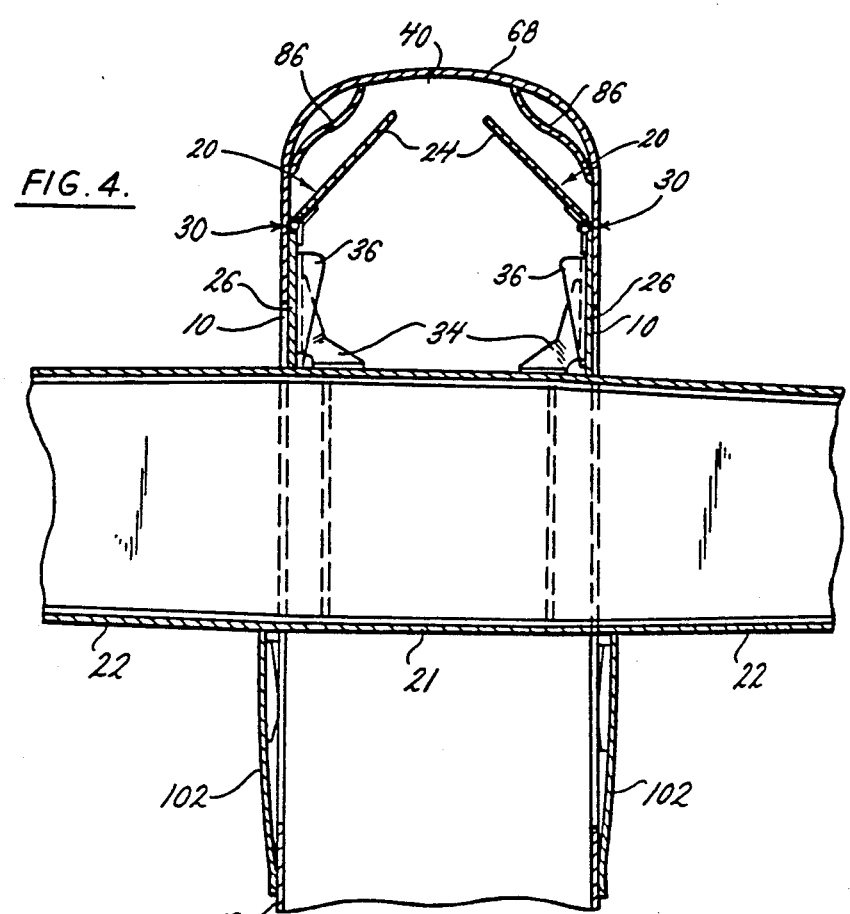
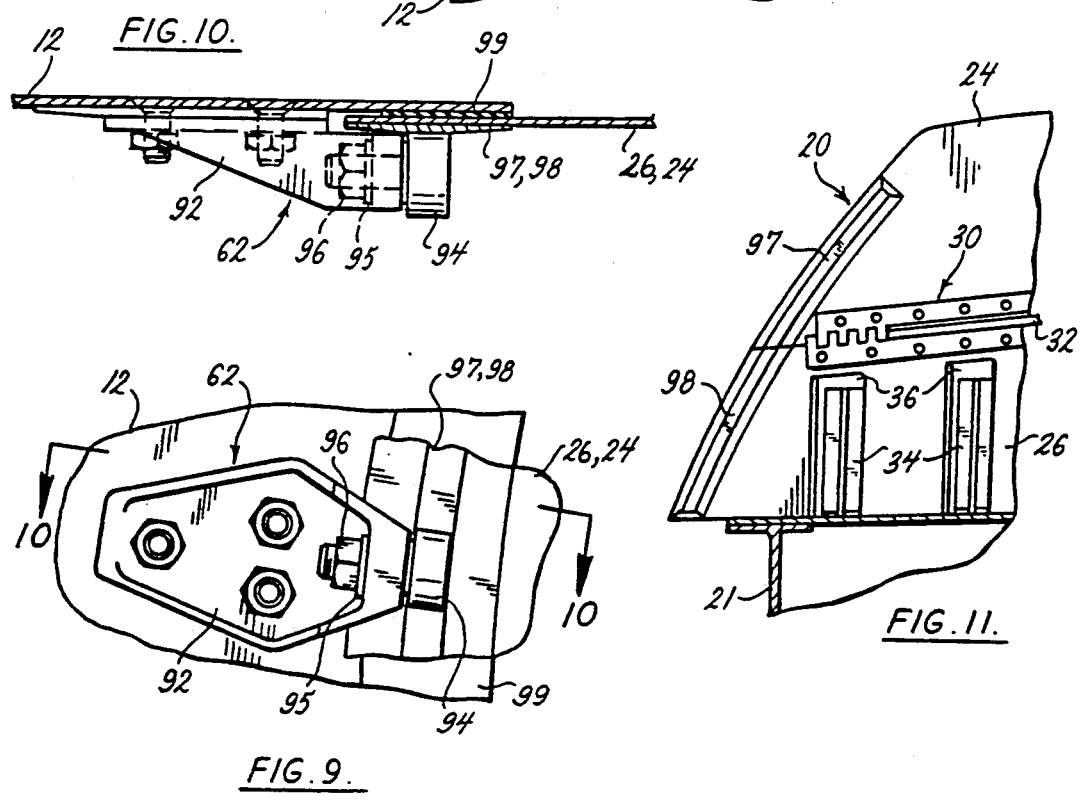

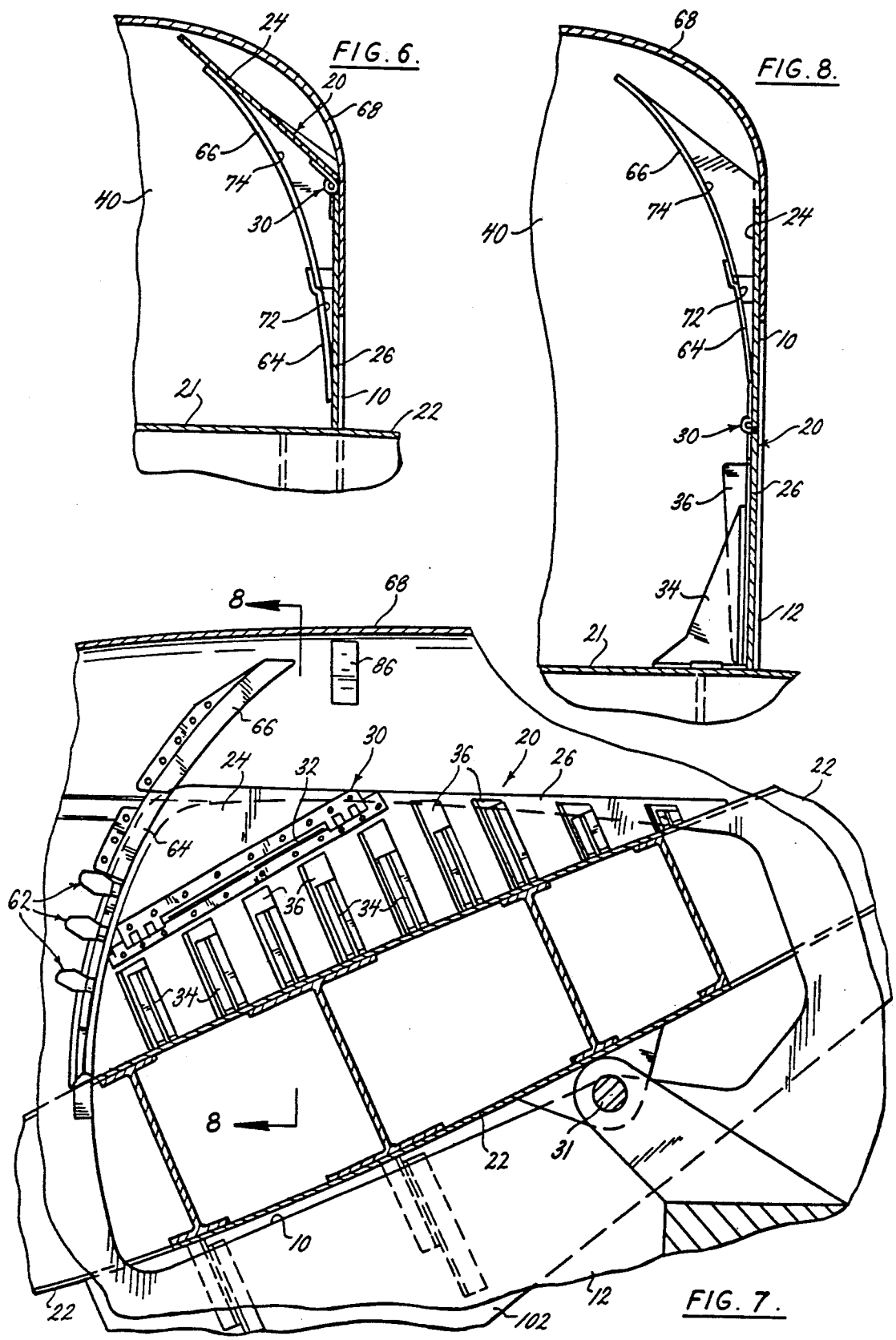

FOLDING INTERNAL COVER

FIELD OF THE INVENTION

The present invention pertains to aircraft aerodynamic seals for movable aircraft structure and more particularly to aerodynamic seals between a vertical stabilizer and a pivotally movable horizontal stabilizer.

BACKGROUND OF THE INVENTION

T-tail configuration aircraft have a vertical tail surface called a vertical stabilizer extending upward from the rear end of the aircraft fuselage and have a pivotally movable horizontal stabilizer extending laterally from a point near the top of the vertical stabilizer. The horizontal stabilizer in this configuration is referred to as a flying wing in some publications.

A horizontal stabilizer is used to vertically trim aircraft in flight and to control the pitch, that is, the nose up or nose down, physical orientation of the aircraft on takeoff and landing. The T-tail configuration is used on twin engine aircraft when the engines are located at the rear of the fuselage to avoid the jet discharge.

Recent aircraft engine design improvements have required the positioning of the engines at the rear, higher on the fuselage than previous configurations. This has had an effect on the design considerations for a flying wing. When the engines are located high on the fuselage, the thrust of the engines create a dive tendency to pitch the aircraft downward because the engines are located above the vertical center of gravity of the aircraft. This effect is more pronounced at takeoff and landing when the engines are at maximum or near maximum thrust and air speed is low. At low air speeds, less air moves across the horizontal stabilizer making it have less effect than at higher air speeds.

To overcome these problems the designer must either increase the size of the horizontal stabilizer or increase the amount of rotation of the pivotally movable horizontal stabilizer so that the horizontal stabilizer can trim the aircraft as necessary. In either case the amount of downward rotation required for the flying wing will be dependent upon the amount of movement needed to counteract the aforementioned dive tendency that results from the required positioning of newer aircraft engine designs.

In a T-tail configuration the support structure for the movable horizontal stabilizer protrudes through the vertical stabilizer. This support structure which passes through the vertical stabilizer is mounted within the vertical stabilizer by a hinge means which permits pivotal movement upward and downward of the horizontal stabilizer substantially transverse to the vertical stabilizer. For the purpose of clarification in this Specification, an upward or downward movement of the horizontal stabilizer is in reference to the leading edge of the horizontal stabilizer. A vertical stabilizer structural opening is necessary to permit the angular movement of the support structure as it pivots about its hinge. Air flow around these structural openings can be detrimentally disturbed when these structural openings are exposed, reducing the aerodynamic effectiveness of the horizontal stabilizer and the vertical stabilizer.

There are two main methods which have been used to cover structural openings which are needed to mount a pivotally movable airfoil. One method is to use a deformable seal to cover the opening, and the other uses externally mounted fairings in various arrangements to cover the opening. A principle consideration of both methods is to provide an effective aerodynamic seal for the structural opening with as small an impact as possible on the aerodynamic performance on the aircraft, that is, to keep additional weight and aerodynamic drag to a minimum when adding the aerodynamic seal to the structural opening.

Fairings have long been used to cover structural openings provided on an aircraft in order to mount a horizontal stabilizer. Fairings, called cover plates, are attached to and movable with the horizontal stabilizer. These cover plates are located above and below the horizontal stabilizer and are substantially larger than the structural opening which they cover. The sizes and shapes of the cover plates are determined by the size of the openings, the total pivotal movement of the horizontal stabilizer and the shape of the horizontal stabilizer support structure. The edges of the cover plates encompass the structural opening and make contact with the opposite adjacent surface on the vertical stabilizer or fuselage as they wipe across that surface through movement of the horizontal stabilizer. The contact between the cover plates and the opposite adjacent surface forms the aerodynamic seal.

The requirement that cover plates have an opposite substantially flat surface area to wipe against is the limiting factor in their use to cover structural openings. The two locations on an aircraft which would be subject to these limitations are on a curved surface, such as on a fuselage, or near the edge of structural surface, such as the top of a vertical stabilizer.

The limitation of a curved surface can be overcome by the addition of fixed fairings to the curved surface to form a substantially flat surface area for the cover plate to wipe against. However, this adds to the weight of the aircraft and increases the aerodynamic drag.

The limitation of placing a structural hole near the edge of a structural surface can be overcome by the addition of a fixed fairing to the surface which would extend the surface area, for example by increasing the height of a vertical stabilizer so that the top cover plate does not extend beyond the top of the vertical stabilizer into the airstream. This method also adds weight and increases aerodynamic drag.

One solution to the problem of a structural hole near the edge of a surface can be found in Ridley, Jr., et al, U.S. Pat. No. 4,034,939. This assembly does not use cover plates, but uses a deformable seal which allows the seal to compress and contract as the horizontal stabilizer is actuated between its maximum up and down positions. However, for this arrangement to be effective, the horizontal support structure hinge must be located such that the structural opening needed for up and down pivotal movement is symmetrical. To achieve this symmetry, the hinge for the horizontal stabilizer support structure must be mounted at the center of the structural opening instead of allowing a remote axis of rotation as sometimes preferred by aircraft designers because this configuration allows a wider distribution of load forces. In addition, the increased downward movement of the horizontal stabilizer, as required for some newer engine designs, require larger structural openings which may be too large for this type of deformable seal to accommodate.

Another solution to the problem is taught by Backlund, et al, U.S. Pat. No. 3,756,529, assigned to the assignee of the present invention. This arrangement teaches that the opposite surface area needed for the contact area of the cover plates can be reduced by the use of pivotally mounted, spring loaded doors hinged to the edges of the structural opening to form a continuation of the substantially flat surface. This allows the structural opening to vary in size depending upon the orientation of the horizontal stabilizer. By this method the top and bottom cover plates can be made smaller. Cam members are fixed to the horizontal stabilizer for pivoting a door inward when the horizontal stabilizer needs to rotate into the area of the structural hole normally occupied by that door.

As previously mentioned newer designs require a greater downward movement of the horizontal stabilizer, therefore, fixed fairing extensions to keep the top cover plate out of the airstream when the horizontal stabilizer is pivoted to the full up position must be made taller. The height of vertical stabilizer fairing extension can be reduced by the arrangement as taught by the U.S. Pat. No. 3,757,529 assembly.

However, this prior art arrangement does not present the best solution to the problem. The pivotal door does occupy space, even in a folded position, and therefore the structural opening must be cut larger than just the area necessary for the maximum up and down pivotal movement of the horizontal stabilizer. In addition, the pivotal door adds to the height of the vertical stabilizer because the door must be mounted high enough to provide a clearance between the folded door and the horizontal stabilizer when it is pivoted through its maximum upward movement. This arrangement also contributes to the aerodynamic drag on the aircraft because it uses the traditional approach of an externally mounted cover plate to make contact with the external surface of the aircraft, and therefore the external cover plate is in the airstream. Additionally, this arrangement is an aerodynamic seal which is composed of two distinct elements, a pivotal mounted door and a cover plate. Each must be manufactured, installed and maintained to work in combination with the other, increasing the overall cost of providing an aerodynamic seal for a T-tail configuration.

OBJECTIVES OF THE INVENTION

It is the broad object of the present invention to provide an aerodynamic seal by mounting a cover plate attached to and movable with a variable incident airfoil internally to the skin of the aircraft adjacent to the structural opening and not externally as has been taught by the above noted prior art, resulting in an overall reduction in aerodynamic drag on the aircraft.

It is a further object of the present invention to provide an aerodynamic seal by means of a movable fairing assembly, internally mounted, which will enable the designer to reduce the vertical stabilizer fairing area above the horizontal stabilizer in a T-tail configuration aircraft. This improvement will result in a reduction in weight and a reduction in the aerodynamic drag on the aircraft allowing more economic operation.

It is an additional object of the present invention to provide an aerodynamic seal for an aircraft having a T-tail assembly, which is easily manufactured and assembled and on which maintenance work can be easily achieved to adjust or to replace the seal assembly or perform work on the horizontal stabilizer actuation systems.

SUMMARY OF THE PRESENT INVENTION

In accordance with the foregoing objects and other objects that will become apparent to one of ordinary skill after reading the following Specification, the present invention provides an improved fairing assembly for sealing the structural openings necessary when a variable incident airfoil is connected to an aircraft mounting structure, and the structural opening is oriented in a direction substantially transverse to the axis about which the variable incident airfoil is moved.

In a preferred embodiment, the seal assembly is provided in combination with a vertical stabilizer and a flying horizontal stabilizer, the vertical stabilizer having an opening from the left side through to its right side and a cavity located within the vertical stabilizer and above the opening.

The horizontal stabilizer has an inboard end positioned adjacent the opening in the vertical stabilizer and a structural support member affixed to the inboard end and extending through the opening into the vertical stabilizer. Hinge means is provided for mounting the horizontal stabilizer for upward and downward stabilizer pivotal movement about an axis transverse to the vertical stabilizer.

The improved moveable fairing seal assembly of the preferred embodiment of the present invention is a top cover plate connected to the upper surface of the horizontal stabilizer. The improved top cover plate, in accordance with one embodiment of the present invention, comprises an upper panel and a lower panel connected together by a spring loaded piano hinge. The lower panel is attached by means of its support brackets to the top surface of the horizontal stabilizer structure whereby the top cover plate moves with the horizontal stabilizer as it is actuated to pivot from its maximum down to maximum up position. The top cover plate is mounted internally to the vertical stabilizer and guided within the vertical stabilizer by cam follower assemblies and guide rails. When the horizontal stabilizer is moved to a full up position, the upper panel is no longer bound by the cam follower assemblies but is bound by a guide rail, which provides a surface for the spring loaded upper folding panel to ride against. The surfaces of the guide rail gradually move away from the sides of the vertical stabilizer allowing the upper panel to fold inwardly within the cavity above the opening. The inward folding movement of the upper panel reduces the total area needed within the vertical stabilizer to internally accommodate a movable fairing which is used to provide an aerodynamic seal for a structural opening. Consequently, the total height of the vertical stabilizer can be less, with a resulting savings in the economic operation of the aircraft by virtue of the reduction in total weight and aerodynamic drag on the aircraft.

Mounted at the top of the cavity is a bump strip. Should the spring loaded piano hinge fail to fold the top panel when the horizontal stabilizer is pivoted in an upward direction, such as if the hinge were jammed by ice, the top panel will strike the bump strip at an angle which will force the upper panel to fold inward at the piano hinge, allowing the horizontal stabilizer to continue its upward movement.

BRIEF DESCRIPTION OF THE DRAWINGS

FIG. 3 is a sectional view of the inboard face of a folding internal top cover plate taken at section 3—3 of FIG. 1 with the horizontal stabilizer in the neutral position;

FIG. 4 is a cross-sectional view of the upper portion of the vertical stabilizer taken at 4—4 from FIG. 3 showing the folding internal top cover plate in a partially folded position;

FIG. 5 is a cross-sectional view of a lower guide rail taken at 5—5 of FIG. 3;

FIG. 6 is a cross-sectional view of a lower and upper rail guide assembly taken at 6—6 of FIG. 3;

FIG. 7 is the same view as FIG. 3 except the horizontal stabilizer is in a maximum down position;

FIG. 8 is a cross-sectional view of a lower and upper rail guide assembly taken at 8—8 or FIG. 7;

FIG. 9 is a detail of a typical cam follower assembly;

FIG. 10 is a cross-sectional view of FIG. 9 taken at section 10—10;

FIG. 11 is a partial perspective view of the forward portion an a folding internal cover plate;

DESCRIPTION OF THE PREFERRED EMBODIMENT

Figure 1:
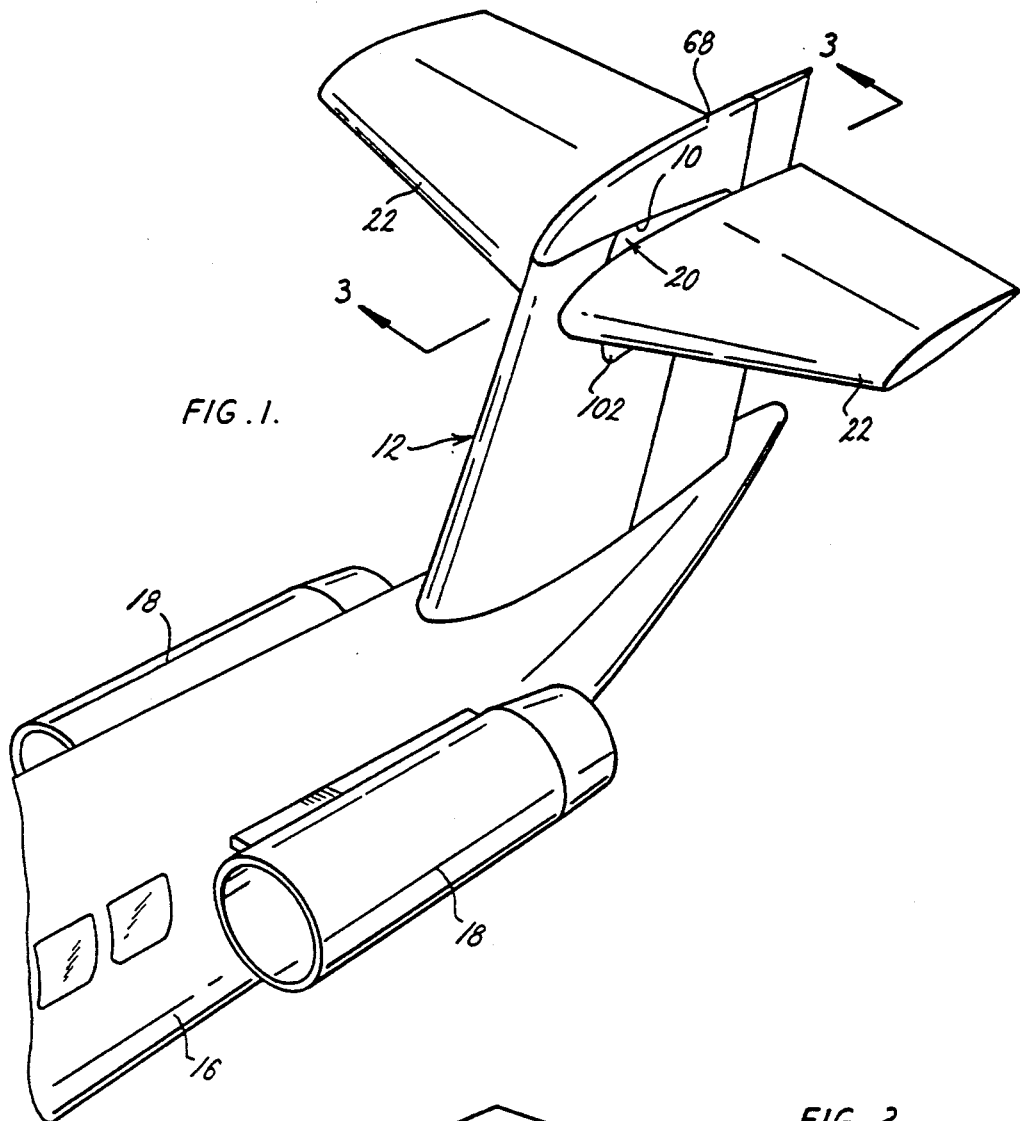
FIG. 1 is a perspective view of a portion of a T-tail configuration aircraft.

Reference is made to FIG. 1 where there is shown a rear section of an aircraft in a T-tail configuration. Fuselage 16 is shown with engines 18 installed in relation to vertical stabilizer 12. A horizontal stabilizer 22 is shown with respect to its location on the vertical stabilizer. A top cover plate 20 is shown, installed within the vertical stabilizer 12, covering a portion of structural opening 10. Reference is now made to FIG. 3. to show that the size and shape of structural opening 10 is determined by the location of pivot point 31 of the support structure 21 for the horizontal stabilizer 22, shown for illustration purposes only in this example to be a remote axis. The size and shape of the structural opening 10 is also determined by the total angular movement required and the shape of the horizontal stabilizer support structure 21, which for the purposes of illustration in the figures that follow, will be substantially rectangular.

A solution to providing an effective aerodynamic seal near the top of a vertical stabilizer, without furnishing additional height to the vertical stabilizer, adding weight to the aircraft, or increasing the aerodynamic drag, is set forth in the foregoing and remaining drawings.

Figure 2:
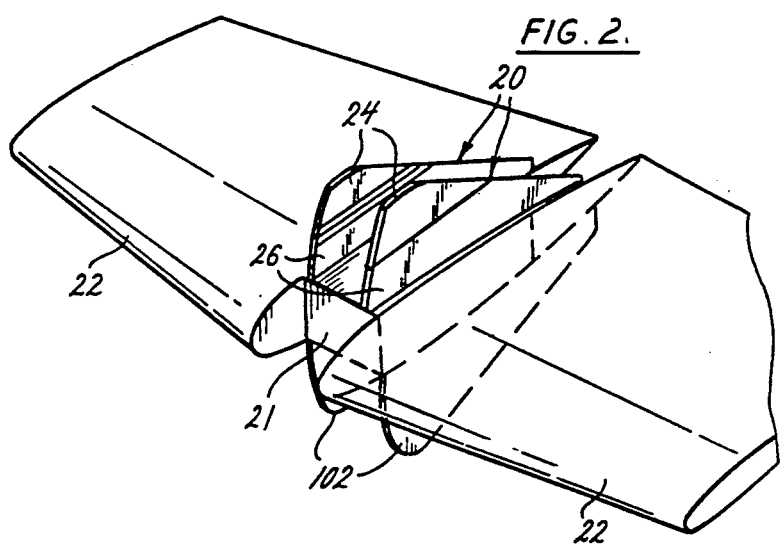
FIG. 2 is a perspective view of an internal top cover plate mounted on a horizontal stabilizer.

FIG. 2 shows a pair of folding internal top cover plates 20 mounted to a horizontal stabilizer support structure 21. A horizontal stabilizer 22 is also shown as an extension of the horizontal stabilizer support structure 21. The cover plate 20 as shown in FIG. 2 is composed of two panels; an upper panel 24 and a lower panel 26.

FIG. 3 shows the inboard face of the folding internal top cover plate 20 as installed with the horizontal stabilizer 22 in the neutral position. The upper panel 24 is attached to the lower panel 26 by a piano hinge 30 that is spring loaded in the inboard direction by a torsion spring 32. The lower panel 26 is attached to the horizontal stabilizer support structure 21 by attach brackets 34. The lower panel 26 is structurally strengthened by stiffeners 36.

The folding internal top cover plate 20 is located within the vertical stabilizer as shown in FIG. 4 which is a sectional view of FIG. 3 taken at 4—4, with the top panel 24 in a partially folded position. In FIG. 4, it is shown that space for the upper panel is provided by an internal cavity 40 in the top most section of the vertical stabilizer.

Returning to FIG. 3, the motion of the folding internal top cover plate, in moving with the horizontal stabilizer, is controlled by guide rails 64, 66 and three cam follower assemblies 62. FIG. 5 taken from section 5—5 of FIG. 3 shows lower guide rail 64 to have a surface 72 which the forward portion of the cover plate 20 will ride against due to torsion spring 32. An additional view FIG. 6 taken at section 6—6 of FIG. 3 shows that the lower guide rail 64 and upper guide rail 66 have surfaces 72 and 74 respectively, which gradually move away from the sides of the vertical stabilizer 12. The top guide rail 66 is attached to the inside of the vertical tip fairing 68. The vertical tip fairing 68, as shown in FIG. 3, is removable by release of screws 39 for ease of installation and to perform maintenance on the folding internal cover plate 20 and its mounting assembly. Internally, the vertical tip fairing 68 acts as a cavity 40 which provides a space for the upper panel 24 to fold. The lower guide rail 64 is attached to the inside of the vertical stabilizer 12 just below the uppermost structure before the split for the aforementioned top segment of the vertical tip fairing 68.

FIG. 7 like FIG. 3 shows the inboard face of the folding internal top cover plate 20, however, this view is with the horizontal stabilizer 22 in the maximum down position. FIG. 7 shows the relative position of the top cover plate 20 with respect to the cam follower assemblies 62, top guide rail 66 and lower guide rail 64 when the horizontal stabilizer is in the maximum down position. Section 8—8 of FIG. 7 is presented in FIG. 8 to show that with the horizontal stabilizer in the maximum down position the top cover plate 24 no longer rides along surfaces 72, 74 of guide rails 64 and 66 but abuts against the skin of the vertical stabilizer 12 covering structural opening 10.

A typical cam follower arrangement 62 is shown in FIG. 9 and a side sectional view taken along 10—10 of FIG. 9 is shown in FIG. 10. The cam follower assemblies 62 are the elements which provide positive mechanical support that react to actual air loads on the surface of panels 24 and 26. A cam follower assembly comprises a cam bracket 92, a cam follower 94, a lock washer 95, and a nut 96. The cam follower assembly is mounted to the forward interior rim of the structural opening 10 as shown in FIGS. 3 and 7.

The cam follower 94 abuts and rolls against wear strips 97 or 98 as shown in FIG. 11. The wear strips 97 and 98 are attached to the inboard leading edge surface of panels 24 and 26 respectively. The wear strips 97 and 98 can be made of stainless steel, aluminum or any other material which will provide a long service life under these operating conditions. In addition, the wear strips 97 and 98 provide additional bracing to the individual panels 24 and 26 to allow movement with little distortion as the forward edge of the panels move under the cam follower 94.

The cam follower assembly 62 is designed to allow a minimal clearance between a Tetrafluoroethylene (TFE) like seal 99 attached to the forward interior rim of structural opening 10 and the outboard facing surfaces of panels 24 and 26 respectively- as shown in FIG. 10. Cam follower assembly 62 forces the outboard surfaces of panels 24 and 26 to abut the TFE-like seal, yet allows the folding internal cover plate 20 to move up or down by means of the rolling action of cam follower 94 in conjunction with wear strips 97 and 98.

The TFE-like seal 99 can be any material which will have a low coefficient of friction in respect to the material used for the outboard surface of the folding internal cover 20 and have a long service life under normal operating conditions.

With the exception of the outboard surface of the folding internal cover plate 20, portions of which are exposed at various times to the airstream, the previous illustrations show that all of the components of this preferred embodiment are located within the vertical stabilizer and thus do not inhibit air flow across the vertical stabilizer 12. Consequently, this invention provides an aerodynamic seal without contributing to the aerodynamic drag on the aircraft.

The folding internal cover plate constructed in accordance with the present invention operates as follows:

With the horizontal stabilizer 22 in the maximum down position, as shown in FIG. 7, the upper panel 24 and lower panel 26, are held against the inside rim of the structural hole 10 by the cam follower assemblies 62. Both panels 24 and 26 are exposed to the airstream and provide the substantial portion of the aerodynamic seal. The bottom cover plate 102, also shown in FIG. 2 in phantom outline and in FIG. 4, which for purposes of this illustration is a conventional design, that is, an externally mounted cover plate, is shown in FIG. 7 partially covering and extending below structural hole 10. With the horizontal stabilizer 22 in the maximum down orientation, the bottom cover plate 102 does not provide any significant portion of the seal over the structural opening 10.

As the horizontal stabilizer 22 is brought back to its neutral position, the upper panel 24 leaves the cam follower assembly 62 and it is no longer exposed to the airstream because the upper panel 24 moves into the interior of the vertical stabilizer 12 guided by the lower guide rail surface 72. As the horizontal stabilizer 22 continues to rise the upper panel 24 will ride onto and abut the upper guide rail surface 74 in response to the inboard-wise force exerted by torsion spring 32. The upper guide rail surface 74 is shaped and installed so as to control the folding action of the upper panel 24 by providing a guide way surface for the upper panel to rest upon and which dictates the extent of the fold in relation to the pivotal position of the horizontal stabilizer 22. As the position of the upper panel 24 rises in the vertical stabilizer 12, as shown in FIG. 6, the amount of inward folding action of the upper panel 24 increases and the extent of inward folding action will be determined upon the pivotal position of the horizontal stabilizer 22.

When the horizontal stabilizer 22 is brought to its full up position, the upper guide rail surface 74 due to its curvature provides the greatest degree of folding action for the upper panel 24. With the horizontal stabilizer in the maximum up position, the bottom cover plate 102 has risen with the horizontal stabilizer support structure 21 and covers a substantial portion of the surface area over the structural opening.

If there is a buildup of ice on the internal folding cover plate 20, the torsion spring 32 may not be strong enough to overcome the ice jam. The top cover panel 24 would not ride against upper guide rail 66 nor fold. To overcome this possible problem, the inner surface at the top of the vertical tip fairing 68, as shown in FIG., 4 is furnished with a metallic, corrosion resistant rugged bump strip 86. The bump strip 86 is curved in shape and installed in a manner that will mechanically force upper panel 24 to fold at piano hinge 30, thus breaking the ice formed thereon and releasing the system jam.

Figure 12:
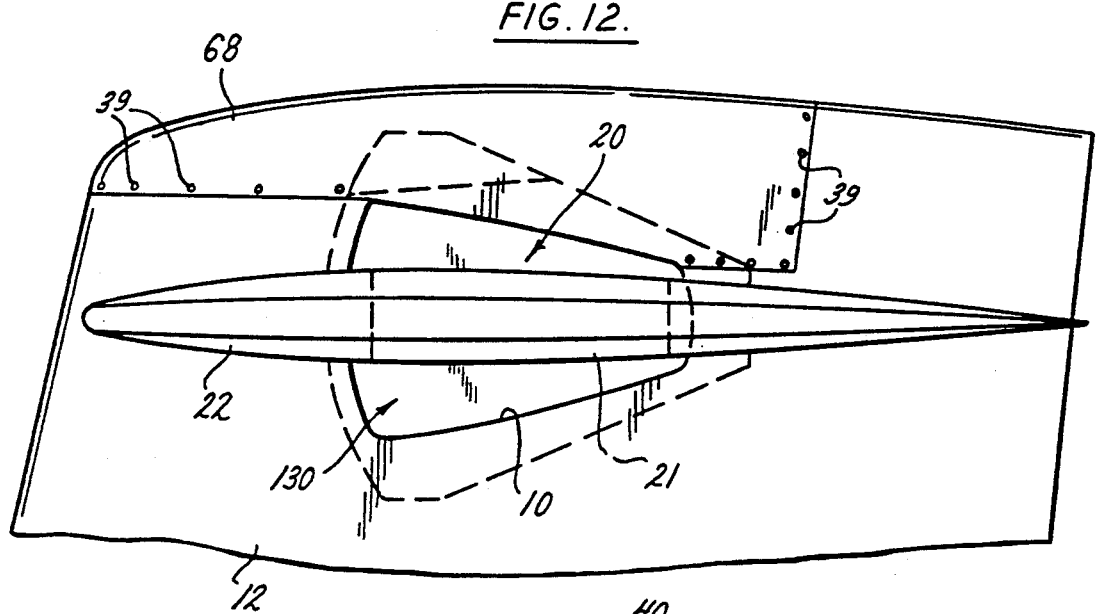
FIG. 12 is an elevation view of the outboard face of internal cover plates mounted above and below a horizontal stabilizer.

The foregoing embodiment was described as a top internal folding cover plate. However, a bottom internal cover plate 130 could also be mounted to a horizontal stabilizer support structure 21 as shown in FIG. 12 in phantom outline. The bottom cover plate would be mounted internally to the skin of the aircraft as disclosed by the above teachings.

Figure 13:
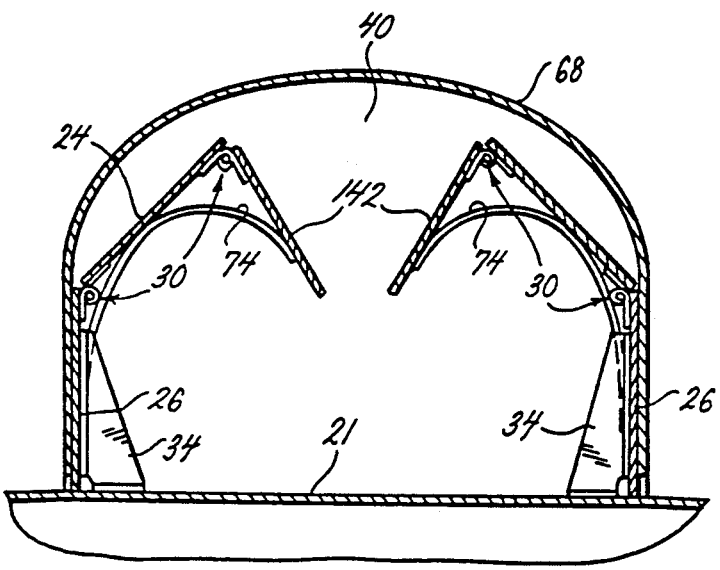
FIG. 13 is a cross-sectional view of the vertical stabilizer with internal top cover plates which have two folding surfaces in a folded position.
Figure 14:
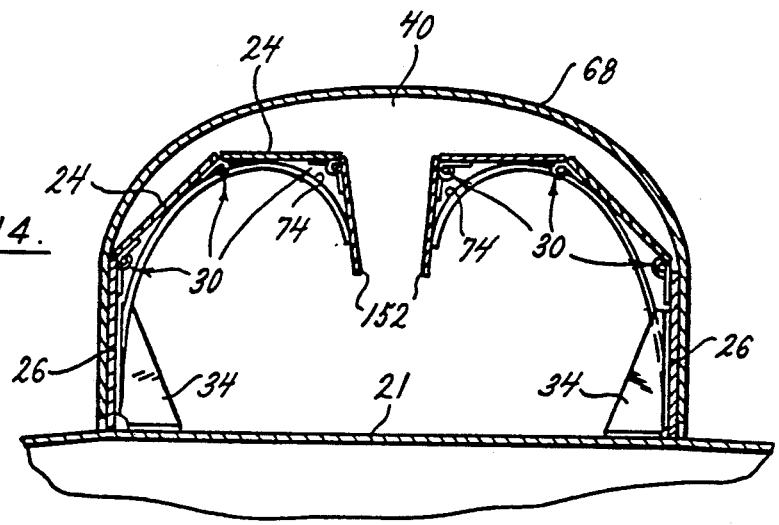
FIG. 14 is a cross-sectional view of the vertical stabilizer with internal top cover plates which have three folding surfaces in a folded position.

In addition, a plurality of panels may be used to reduce the capacity required of the internal cavity 40, as shown in FIG. 13, which shows a folding cover with 2 upper panels, and FIG. 14 which shows a configuration with 3 upper panels. In these configurations the top rail guide 66 is extended with increased curvature to allow cover panels 142 and 152 as they respectively rise within the vertical stabilizer to ride against the top rail guide surface 74, and fold within the cavity 40 making way for the panels below to also rise along the rail guide surface 74 and fold. The cam assemblies are not shown in either FIG. 13 or 14 but will function as previously taught.

A detailed description has been provided for one embodiment of this invention. It should be understood that the descriptions provided although only describing one side of the aircraft in some cases apply equally to the other side of the aircraft. Having thus described illustrative embodiments of the present invention, it is understood that modifications thereof, including the use of curved surfaces for cover plates, will become apparent to those skilled in the art, and it is to be understood that these deviations are to be construed as part of the present invention.

What is claimed is:

1. A seal assembly, for an aircraft having a vertical stabilizer and a horizontal stabilizer comprising:
   a structural opening in the vertical stabilizer through which the horizontal stabilizer extends;
   an internal cavity in the vertical stabilizer adjacent said structural opening;
   a hinge means disposed within the vertical stabilizer adjacent said structural opening for rotatably supporting the horizontal stabilizer to allow the rotation thereof upward and downward about an axis substantially transverse to the vertical stabilizer;
   a cover plate composed of at least one upper panel and a lower panel;
   said cover plate being attached to the horizontal stabilizer;
   seal means associated with said structural opening and said cover plate for fitting said cover plate immediately adjacent to internal surfaces of the vertical stabilizer adjacent said structural opening;
   said seal means including a hinge connecting said upper panel and said lower panel and mounting means for mounting said upper panel and said lower panel internally to the vertical stabilizer;

said being spring biased to fold said cover plate into said internal cavity of the vertical stabilizer when the horizontal stabilizer is rotated upward.

2. A seal assembly for an aircraft having a vertical stabilizer intersected by a rotatable horizontal stabilizer comprising:

the vertical stabilizer having an opening adjacent the intersection with the horizontal stabilizer;

means connected to and rotating with the horizontal stabilizer for sealing at least part of said opening;

said sealing means being pushed into and pulled out of a cavity within the vertical stabilizer by the rotation of the horizontal stabilizer; and said sealing means including means for folding into said cavity when said sealing means is pushed into said cavity.

3. The seal assembly recited in claim 2 wherein said sealing means is comprised of panels and said folding means is comprised of at least one hinge connecting said panels.

4. The seal assembly recited in claim 3 further comprising:

forcing means for forcing said panels to fold; and overcoming means for overcoming said forcing means and forcing said panels to become coplanar when the horizontal stabilizer is rotated in a first direction.

5. The seal assembly recited in claim 3 further comprising:

forcing means for forcing said panels to fold when they are pushed into said cavity; and overcoming means for overcoming said forcing means and forcing said panels to become coplanar when they are pulled out of said cavity.

6. The seal assembly recited in claim 3 further comprising:

a horizontal stabilizer axis of rotation about which said horizontal stabilizer rotates;

said horizontal stabilizer axis of rotation lying transverse to said opening, whereby said sealing means rotates about an axis of rotation lying transverse to said opening;

a hinge axis of rotation, said hinge providing said panels with a rotational degree of freedom about said hinge axis of rotation;

said hinge axis of rotation and said horizontal stabilizer axis of rotation being nonparallel, whereby said panels rotate about nonparallel axis of rotation when said panels are pushed into said cavity and pulled out of said cavity.

7. The seal assembly recited in claim 6 wherein said hinge is a plurality of hinges and said hinge axis of rotation is a plurality of hinge axes of rotation which lie parallel to each other.

8. The seal assembly recited in claim 4 further comprising:

a horizontal stabilizer axis of rotation about which said horizontal stabilizer rotates;

said horizontal stabilizer axis of rotation lying transverse to said opening, whereby said sealing means rotates about an axis of rotation lying transverse to said opening;

a hinge axis of rotation, said hinge providing said panels with a rotational degree of freedom about said hinge axis of rotation;

said hinge axis of rotation and said horizontal stabilizer axis of rotation being nonparallel, whereby said panels rotate about nonparallel axis of rotation when said panels are pushed into said cavity and pulled out of said cavity.

9. The seal assembly recited in claim 8 wherein said hinge is a plurality of hinges and said hinge axis of rotation is a plurality of hinge axis of rotation which lie parallel to each other.

10. The seal assembly recited in claim 8 wherein said overcoming means is a guide for said panels which is located in said cavity.

11. The seal assembly recited in claim 10 wherein said forcing means is comprised of a spring.

12. The seal assembly recited in claim 11 wherein said forcing means is further comprised of a contoured bump strip located in said cavity against which one of said panels will impact when said horizontal stabilizer is rotated in a direction opposite of said first direction.

13. A seal assembly for an aircraft having a vertical stabilizer intersected by a horizontal stabilizer comprising:

the horizontal stabilizer being rotatable about an axis of rotation;

the vertical stabilizer having an opening adjacent its intersection with the horizontal stabilizer, the size of said opening varying with the rotation of the horizontal stabilizer;

said horizontal stabilizer axis of rotation lying transverse to said opening;

panels for sealing at least part of said opening;

said panels being attached to the horizontal stabilizer, whereby they have a rotational degree of freedom about said axis of rotation of the horizontal stabilizer;

a hinge connecting said panels;

said panels being retractable into a cavity within the vertical stabilizer and folding about a hinge axis of rotation when said panels are retracted into said cavity;

the retraction of said panels into said cavity being caused by the rotation of the horizontal stabilizer about said axis of rotation of said horizontal stabilizer;

said hinge axis of rotation and said axis of rotation of the horizontal stabilizer being nonparallel, whereby said panels simultaneously rotate about nonparallel axes, one of which lies transverse to said opening, when said panels are retracted into said cavity.

14. The seal assembly recited in claim 13 wherein said hinge is a plurality of hinges and said hinge axis of rotation is a plurality of hinge axes of rotation which lie parallel to each other.

15. The seal assembly recited in claim 13 further comprising a spring attached to said panels which forces said panels to fold on being retracted into said cavity.

16. The seal assembly recited in claim 15 further comprising a guide mounted in said cavity for forcing said panels to become coplanar when said panels are drawn out of said cavity.

* * * * *